Figure 1:
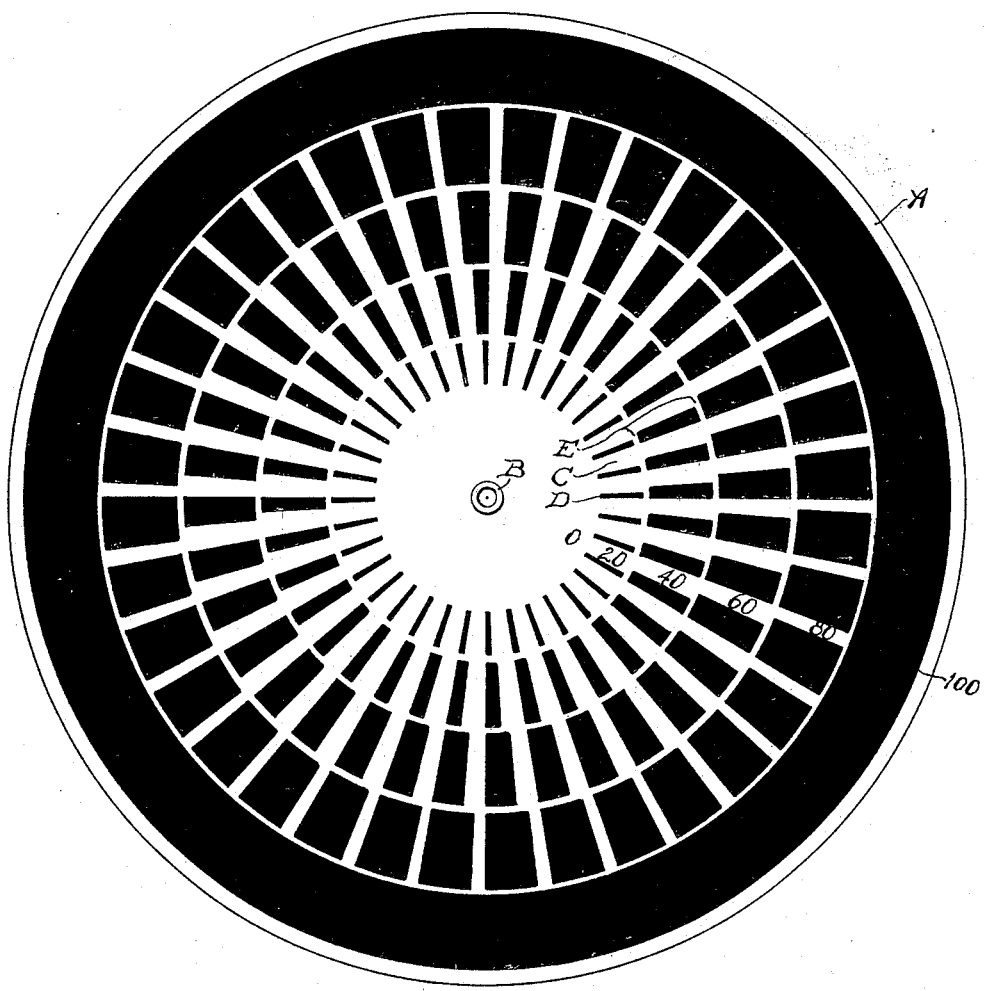

E. P. ROBERTS.
DEVICE FOR TESTING THE DENSITY OF SMOKE.
APPLICATION FILED OCT. 17, 1912.

1,151,395.

Patented Aug. 24, 1915.
2 SHEETS—SHEET 1.

E. P. ROBERTS.
DEVICE FOR TESTING THE DENSITY OF SMOKE.
APPLICATION FILED OCT. 17, 1912.
1,151,395.
Patented Aug. 24, 1915.
2 SHEETS—SHEET 2.
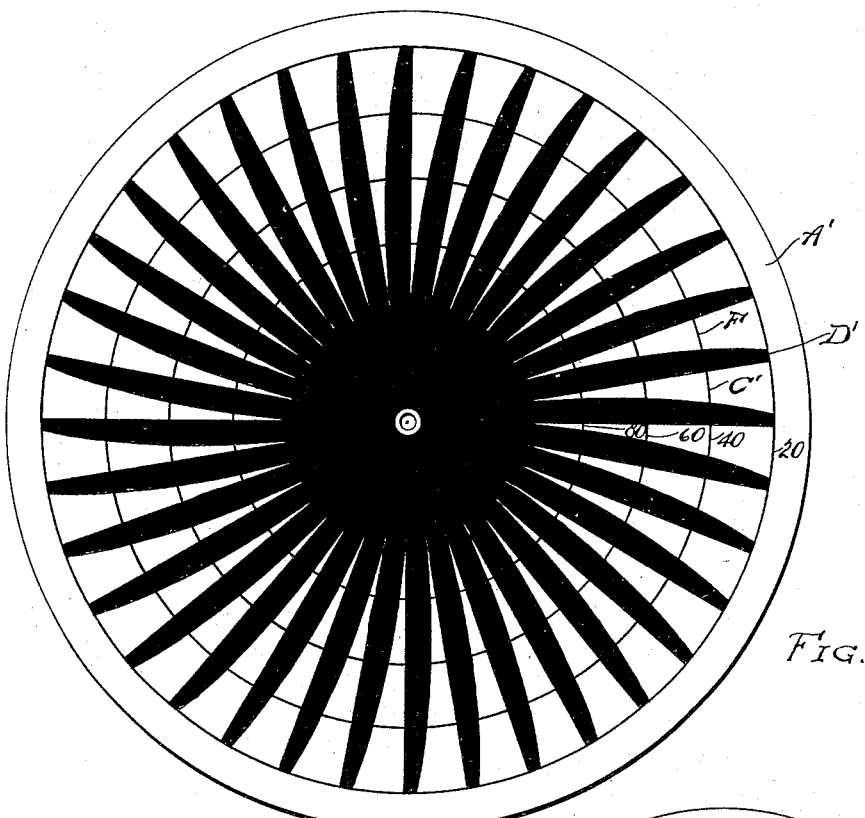
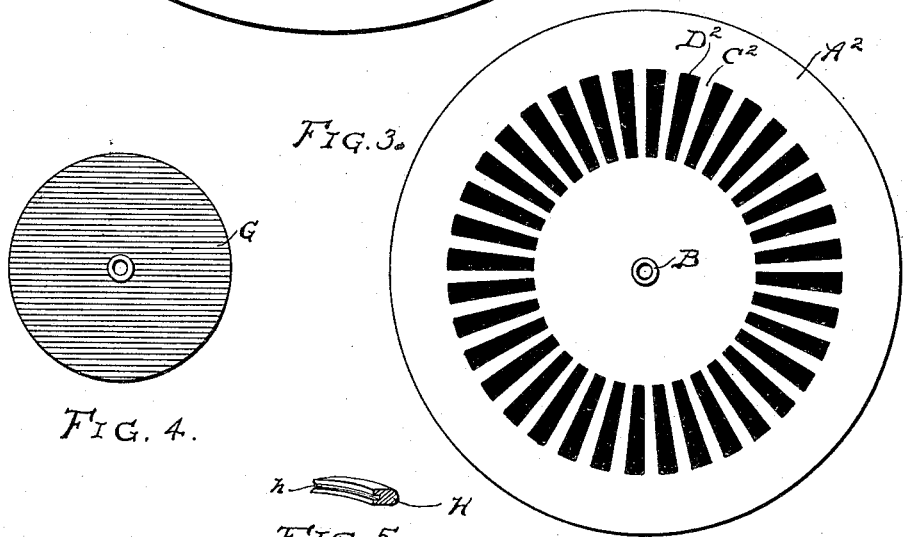
WITNESSES:
Justin W. Macklin
R. L. Bruck
INVENTOR:
Edward P. Roberts,
BY Albert H. Bates,
ATT'Y

UNITED STATES PATENT OFFICE.

EDWARD P. ROBERTS, OF EAST CLEVELAND, OHIO.

DEVICE FOR TESTING THE DENSITY OF SMOKE.

1,151,395.  Specification of Letters Patent.  Patented Aug. 24, 1915.

Application filed October 17, 1912. Serial No. 726,212.

*To all whom it may concern:*

Be it known that I, EDWARD P. ROBERTS, a citizen of the United States, residing at East Cleveland, in the county of Cuyahoga and State of Ohio, have invented a certain new and useful Improvement in Devices for Testing the Density of Smoke, of which the following is a full, clear, and exact description, reference being had to the accompanying drawings.

The object of this invention is to provide a simple device to aid one in estimating the density of smoke emitted from a chimney or stack. Many cities have ordinances prohibiting the emission of smoke having more than a certain percentage of blackness. It is frequently difficult for the smoke inspector to accurately estimate the percentage of blackness in smoke emitted from a given chimney, and, in enforcing the ordinance, it is sometimes impossible to convince a court or jury that the inspector's estimate is accurate or amounts to more than a mere guess.

To aid the inspector in accurately estimating the percentage of blackness, the United States Government publishes four charts known as the "Ringleman" charts, having alternate white and black portions in a given ratio, one chart being twenty per cent. black and eighty per cent. white, another forty per cent. black and sixty per cent. white, another sixty per cent. black and forty per cent. white, and the fourth eighty per cent. black and twenty per cent. white. These charts are supposed to be placed such a distance from the observer that the black and white portions blend to the eye, producing a gray of a definite percentage or density, which furnishes a standard of comparison for the smoke emitted. To cause the blending, however, the charts must be at a distance of at least fifty feet from the observer. Now, this is frequently impossible to carry out and is usually inconvenient. Furthermore, the limits of an ordinary court room are such that it is usually impossible to place the chart where the black and white portions will blend to the eye of the judge or jury, and thus the smoke inspector can not effectively demonstrate the kind of test he applied in estimating the density of the smoke.

It is the purpose of my invention to provide a simple and cheap substitute for the Ringleman charts which may be easily carried about by the observer and used in any location, as a criterion for estimating the density of smoke observed. Not only does this add greatly to the convenience of the work of the inspector, but enables him to show to the court exactly the form of test he made.

The essential feature of my device consists of a disk having black and white thereon in definite proportions and so arranged that, when the disk is spun, the black and white will blend into a gray of a given percentage. Thus, the smoke inspector may have always available, irrespective of his position at the time of observation, a convenient criterion. He simply places the disk on a suitable point (for example, the point of a pencil) and spins it with his hand, or, if desired, by some suitable apparatus, at a sufficient speed to cause the black and white to blend, which gives him an accurate standard for comparison of the smoke emitted.

I may have a series of disks with the black and white of different proportions on the different disks so that the inspector selects one disk or another suitable for the comparison. Or, I may have black and white arranged in different ratios on different portions of the same disk, in which case the inspector, upon spinning the disk, would obtain a variety of densities, and he would select the one which most closely corresponds with the smoke emitted. In the latter case the different densities may be in sharply defined bands, each of a definite ratio, or the density may increase or decrease gradually as the distance from the center increases, the percentage being read at a definite line on the disk.

As a further feature, I propose to provide disks adapted to be associated with the black and white disks and having additional different shades of blue or gray, corresponding to different colors of the sky, so that, by selecting a disk similar to the sky at the particular time, the inspector may obtain or demonstrate the color relation of a certain density of smoke to a certain sky background.

My invention, comprising the features above referred to, or any of them, is hereinafter more fully explained, and its essential characteristics are set out in the claims.

In the drawings, Figure 1 is a plan or face view of one embodiment of my invention, the disk in this case providing bands of varying percentages of blackness, the highest per cent. being adjacent to the periphery and the lowest at the center; Fig. 2 is a face view of another form of disk wherein the various percentages of blackness decrease gradually from the center outwardly and the particular percentage is obtained by observing the tint at a certain circular line on the disk; Fig. 3 is a view of another form of disk, wherein there is but one band of a definite ratio of black and white. This view is illustrated of a series of disks having their proportion of black and white varying in percentages desired; Fig. 4 is a view of a small color disk adapted to be placed centrally over any of the main disks and give a representation of the color of the sky. I prefer to have several disks like Fig. 4 of varying tints of blue or gray; Fig. 5 is a fragmentary view of a metal rim which may be employed on any of the disks shown in Figs. 1 to 3 to increase the inertia thereof and provide for a more regular and continuous rotation.

Referring first to Fig. 1, A represents a disk of paper, sheet metal, or some suitable material having a central hole preferably braced by an eyelet B. Concentrically arranged around the center are bands, each composed of white radiating spaces or arms C and black radiating spaces or arms D, these being arranged alternately and in definite proportions. The central portion of the disk is perfectly white, or has no percentage of blackness, as indicated by O; then comes a band, designated 20, of black and white arms in the proportion of four units of white area to one of black. Accordingly, when the disk is spun this band will show a light gray, having twenty per cent. of blackness. Outside of this is a band designated 40 wherein the black is forty per cent. of the white, and next to this a band where the black is sixty per cent., and outside of this a band where the black is eighty per cent. and then finally a band of absolute blackness, as indicated by 100. Between the bands are preferably white circles, indicated by E, so that when the disk is spun there will be no optical illusion of one band apparently darkening the adjacent one. Such a disk as described, when placed on a suitable point or rod and spun, exhibits, at a glance, various shades which smoke may have, varying by twenty per cent. from perfect white to absolute blackness. By spinning the disk and looking alternately at the smoke emitted and at the disk, the inspector can select easily and accurately the band which corresponds most closely in color to the density of the smoke.

Fig. 2 exhibits a somewhat different arrangement, wherein there is a disk $A^1$ having a central opening, and radiating continuous arms $C^1$ of white and $D^1$ of absolute blackness. The ratio of the black to the white decreases gradually as one progresses outwardly, preferably at a constant rate, and any specific percentage of blackness is obtained at some definite distance from the center. The distances for the desired per cents. are marked on the disk by concentric circles F. The center in this figure, being one hundred per cent. black, the first circular line indicates eighty per cent., the next sixty, then forty, and then twenty, as indicated by the numerals on the drawing. This disk is like that shown in Fig. 1, in that when the disk is spun the inspector has before him, at a glance, standards of the different shades of smoke. The shades at the circles, varying by twenty per cent., correspond to the bands in Fig. 1, but in Fig. 2 intermediate percentages are also shown between the circles.

Fig. 3 shows a disk of which there are designed to be a set, each to indicate a smoke of a different density. In this case, $A^2$ is the body of the disk, and B is the central eyelet and opening B, and there is a single band composed of white arms $C^2$ and black arms $D^2$ arranged in definite proportions. As here shown, the area of the black is sixty per cent. and the white forty, so that, when this disk is spun it represents a smoke having a density of sixty per cent. Another disk may be furnished representing a density of forty per cent.; another eighty, and so forth. The operator, by selecting a proper disk and spinning it has at once a test for the smoke observed.

Inasmuch as the color of the sky has some influence on making an accurate observation, I provide disks G, shown in Fig. 4, of various shades or tints of blue or gray. By selecting the disk most nearly resembling the color of the sky at the time of inspection and placing this disk over the point on which the main disk is to be spun, so that the blue disk stands in the center, the inspector is aided by having, in proximity with the gray band, a representation of the sky.

Any of the black and white disks may be provided with a comparatively heavy rim to increase the duration and regularity of their spinning. Such a rim is illustrated at H in Fig. 5. It is an annular member preferably of metal having an internal groove $h$ into which the disk may be sprung by a temporary distortion.

As stated, the disk may be spun in any suitable manner. A convenient apparatus may be provided for this purpose, if desired, though I find it entirely sufficient to put the disk over the point of a pencil or awl, or similar instrument, and spin it by the finger. It requires only a comparatively slow speed of spinning to blend the black and white into a gray. When the blending takes place, any increase in speed above that amount is immaterial, as the per cent. is absolutely fixed by the ratio of the black and white in the band.

My disk obviates the necessity of the inspector carrying about the cumbersome Ringleman charts and performs the desired result more simply and effectively. Not only do the disks described furnish criterions for estimating the density of the smoke, but they enable the inspector to demonstrate to the court or jury, if occasion requires, the method by which he estimated the density, and thus he is in better position to prove to the court and jury the emission of dense smoke with which he charges a defendant.

Having thus described my invention, what I claim is:

1. A device for testing the density of smoke consisting of a disk having on it black and white spaces in definite ratio arranged about a center and bounded by a continuous circular band displaying one extreme of the ratio gamut, whereby when the disk is spun said spaces are blended to form a gray having definite percentage value.

2. A device for the purpose described consisting of a disk having thereon alternate black and white spaces in definite ratios side by side and arranged about the center, and bounded by continuous circular portions displaying extremes of the ratio gamut.

3. In a device of the character described, a disk having a series of concentric circles thereon and radiating black and white spaces in the bands between the circles arranged in definite ratios to each other measured circumferentially, the ratio successively varying from a portion of absolute blackness to a portion entirely white.

4. A device for the purpose described, consisting of a disk adapted to be spun and having a series of concentric bands thereon, each consisting of alternate black and white portions in definite ratio, the ratio of one band differing from that of another, and a center portion and an outside band, one of which is absolutely black and the other of which is absolutely white.

5. In a device of the character described, a disk adapted to be spun, and marked with alternate black and white radiating spaces, the areas of the black bearing a decimal ratio to the white area, and the whole being bounded on one side by a continuous white portion, whereby when the disk is spun a gray of a given decimal per cent. is produced.

6. In a device of the character described, a disk having annular bands thereon located about the center of the disk and each consisting of alternate black and white radiating arms, the areas of the black bearing definite ratios to the areas of the white, and continuous circular lines separating the bands.

7. In a device of the character described, a disk adapted to be spun, having a series of concentric bands thereon, each consisting of alternate radiating white and black spaces, the area of the black bearing a definite ratio to that of the white in any band, this ratio differing in different bands, and concentric white bands on the disk separating the black-and-white bands from each other when the disk is spun.

8. In a device of the character described, the combination of a disk adapted to be spun, a central opening therein, an annular band about the opening consisting of alternately arranged black and white spacing side by side, said spaces bearing a definite ratio to each other and blending into a gray of definite percentage when the disk is spun, and a color disk adapted to be held in proximity to the band when the disk is spun.

9. In a device of the character described, the combination of a disk adapted to be spun and having an annular band made up of alternate black and white radiating portions arranged about a central space, the black and white being of definite proportions, and a series of disks colored to represent different colors of the sky adapted to be placed over the center of the black and white disk, the black and white disk and the color disk each having a central orifice.

In testimony whereof, I hereunto affix my signature in the presence of two witnesses.

EDWARD P. ROBERTS.

Witnesses:
ELEANOR RAOFE ROBERTS,
T. H. BUSHNELL.